UNITED STATES PATENT OFFICE.

THOMAS TILFORD KENNERLY, OF GRAYSON, GEORGIA, ASSIGNOR OF ONE-HALF TO JOHN N. KENNERLY, OF ATLANTA, GEORGIA.

PEA-THRESHER.

1,373,334.

Specification of Letters Patent. Patented Mar. 29, 1921.

Application filed April 14, 1920. Serial No. 373,860.

*To all whom it may concern:*

Be it known that I, THOMAS T. KENNERLY, a citizen of the United States, residing at Grayson, in the county of Gwinnett and State of Georgia, have invented certain new and useful Improvements in Pea-Threshers; and I do hereby declare the following to be a full, clear, and exact description of the invention, such as will enable others skilled in the art to which it appertains to make and use the same.

This invention relates to new and useful improvements in threshing machines and more particularly to a machine of this character which is especially adapted for threshing and separating peas, beans and vegetables of the like character from their shells.

The main object of this invention is the provision of a threshing machine so constructed and arranged that it is particularly adapted for the shelling of peas, beans and vegetables of the like character whereby the peas or beans will be quickly and readily removed from their shells or pods in an efficient manner.

A further object of the invention is the provision of means whereby, should any of the peas or beans pass through the thresher without having become thoroughly shelled, they will be returned to the feeding hopper and again passed through the machine.

Another object of the invention is the provision of means whereby the vegetables to be threshed will be retained within the threshing device should the vegetables be only partially dried so as to assure a thorough shelling of the same before being passed on to the separator.

Still another object of the invention is the provision of a threshing machine of this character which can be suitably mounted for transportation from place to place and, at the same time, can be operated by any suitable power adapted for this purpose.

Figure 1:
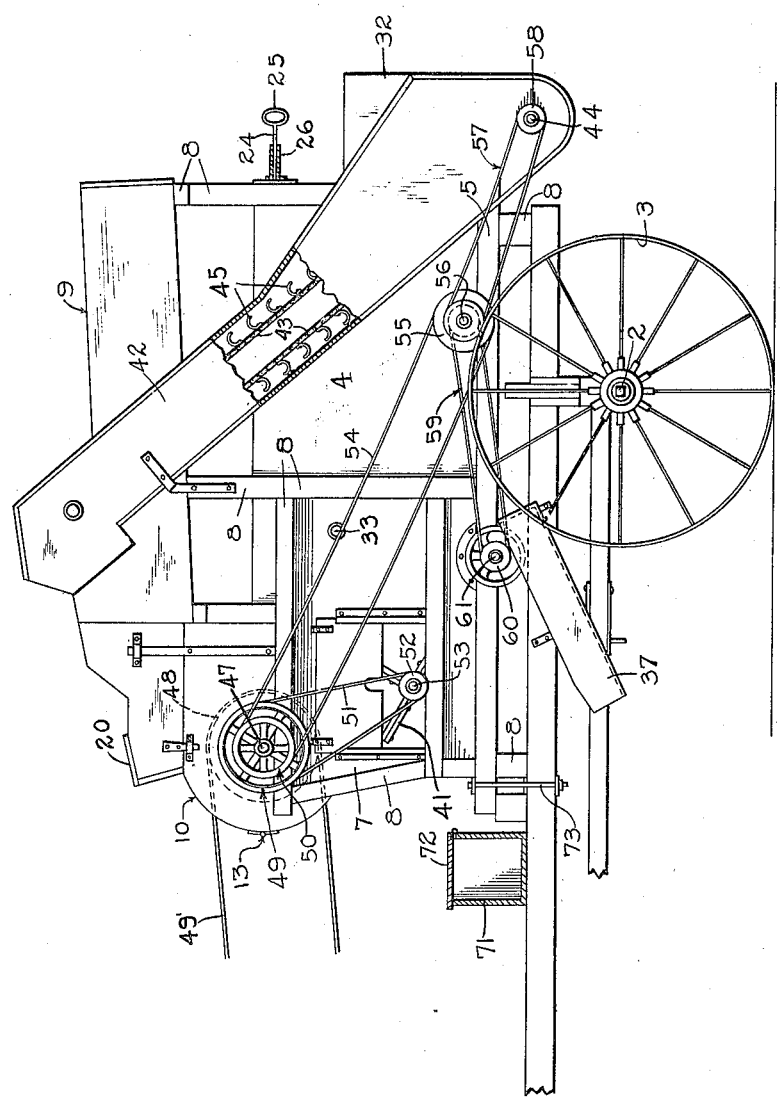
Figure 2:
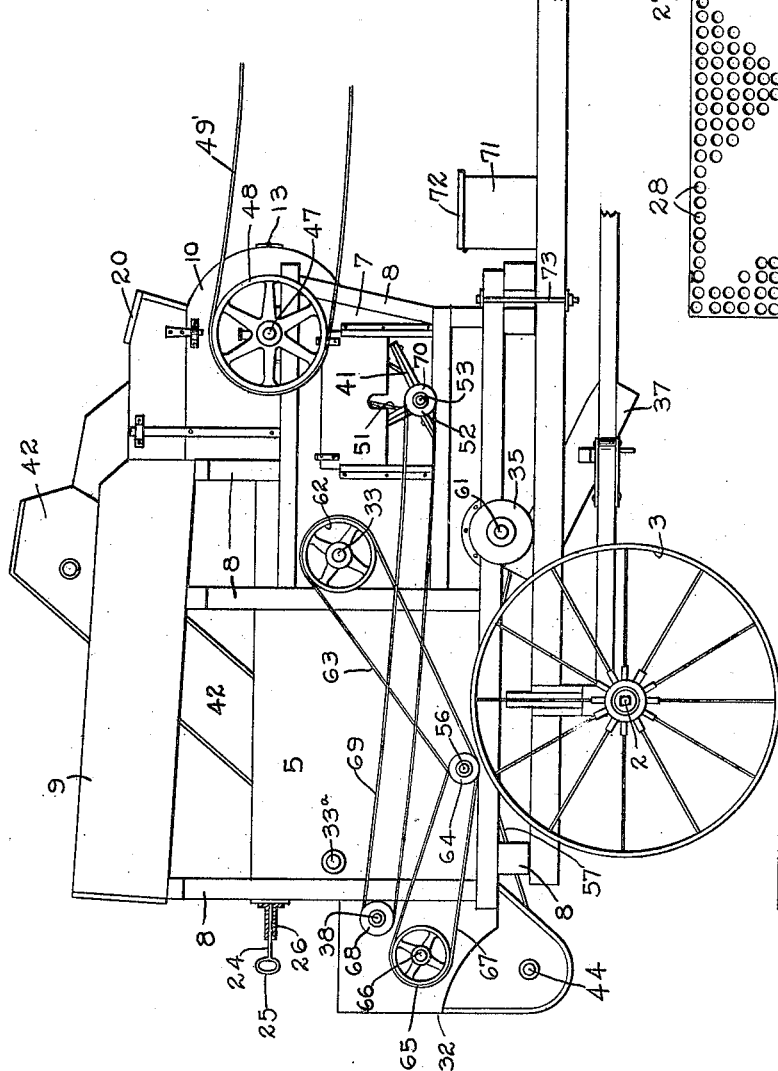
Figure 3:
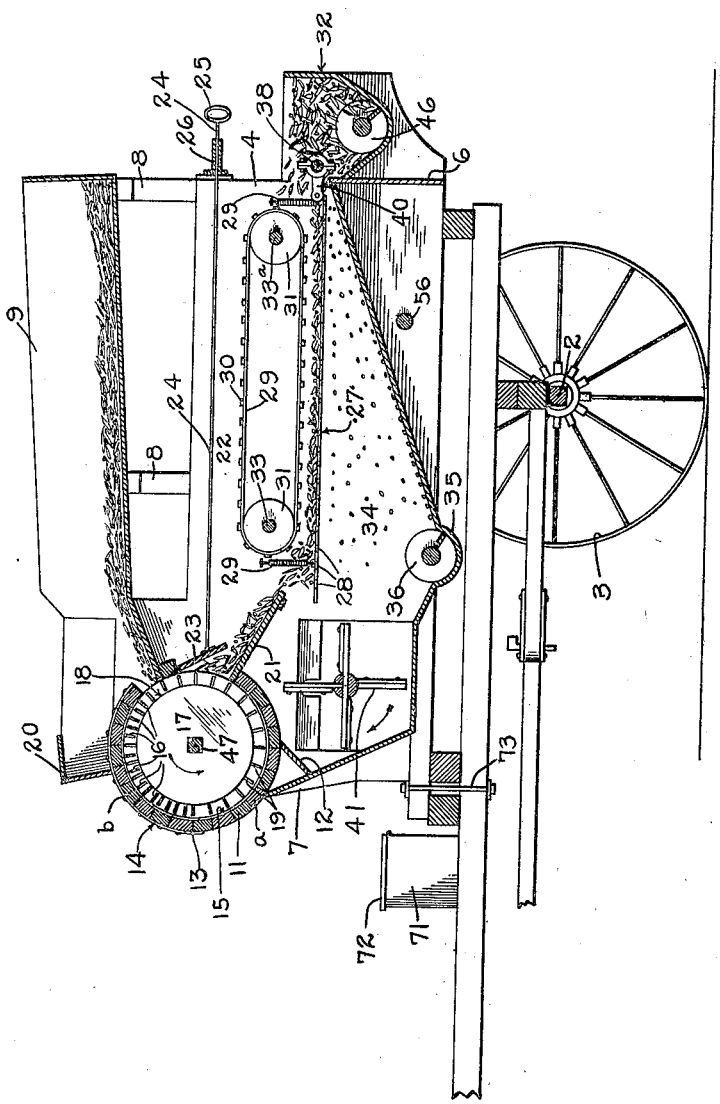

With the above and other objects in view, the invention consists in the novel features and construction, the combination and arrangement of parts hereinafter more fully described, pointed out in the claim and illustrated in the accompanying drawings in which, Figure 1 is a side elevation of a threshing machine constructed in accordance with my invention, Fig. 2 is a similar view taken from the opposite side of the machine to that shown in Fig. 1, Fig. 3 is a longitudinal sectional view taken through the body of the machine, and Fig. 4 is a detailed plan view of the separator.

Referring now in detail to the drawings, it will be noted that I have illustrated suitable transportation means for my improved threshing machine which includes a suitable truck comprising a platform mounted upon the transverse axles 2 which are supported by the wheels 3 and from this it will be apparent that my improved machine can be readily transported from place to place. The threshing machine itself includes a body 4 comprising the side walls 5, end wall 6 and the front wall 7, all suitably retained in their respective positions by means of the uprights and cross-pieces 8.

Upon the top of the body, I provide a suitable hopper 9 which is adapted to receive the peas, beans and vegetables of the like character prior to their entrance into the threshing chamber 10. This threshing chamber 10 is located at the forward end of the body 4 and includes in its construction the concave 11, which is formed as herein illustrated, of a plurality of longitudinal strips arranged in parallel relation and extending transversely across the forward end of the body. These strips, which form the concave 11, are preferably of wood and of suitable toughness to withstand a considerable length of wear. The concave itself is formed in two sections, the section *a* being stationary and supported within the forward end of the body 4 by means of the front wall 7 and the base member 12, while the section *b* of the concave is movably mounted and pivotally connected to the section *a* by means of the hinges 13 whereby this section *b* may be swung outwardly from the threshing chamber when desired. As illustrated in the accompanying drawings, the longitudinal strips which constitute the section *b* are securely retained in their relative positions by means of the straps 14 which extend transversely of the outer surface of the section *b* and provided with means whereby said strap is individually connected with each one of the strips which form this movable section *b*.

The concave itself is preferably lined upon the interior thereof with sheet metal as indicated at 15 so as to preserve the inner faces of the strips which form the concave itself and, at the same time, present a smooth and unbroken surface over which the vegetables to be threshed are passed. The section *b* of the concave is provided upon its inner face with a plurality of teeth 16 arranged in alternate relation, which are adapted to engage the pods or shells of the vegetables to assist in removing the vegetables therefrom.

Operating in conjunction with the concave 11 is the cylinder 17 and before proceeding further with the particular construction of this cylinder, it is to be understood that the same may be formed either of solid formation or hollow in construction, but in either case, the entire outer surface of this cylinder will be provided with a metallic cover 18. The outer surface of this cylinder is provided with the teeth 19 which are arranged in alternate relation over the entire outer surface of the same and particularly arranged in such a manner that they will pass between the teeth 16 on the movable section *b* of the concave 11 and from this it will be apparent that as the vegetables to be shelled pass from the hopper 9 into the threshing chamber, they will be compelled, through the rotation of the cylinder 17 to pass between the cylinder and the movable section *b* of the concave whereby the teeth 16 of the concave and the teeth 19 of the cylinder will break up the pod or shell and tend to remove the vegetables therefrom.

In Fig. 3 it will be noted that I have provided a suitable guide or stop 20 at the forward end of the hopper 9 so that the vegetables from within the hopper will be directed into the threshing chamber. This Fig. 3 also discloses means for directing the shelled vegetables into a suitable separator, said means including the chute 21 connected with the threshing chamber by having the same attached to the concave 11 at the open side thereof. Thus, after the vegetables have been shelled, they will be passed around through the threshing chamber by the rotation of the cylinder 17, into the chute 21 and thence into the separating chamber which is generally indicated by the numeral 22.

It often occurs that an attempt is made to shell vegetables which are only partially dried and in this event, it is necessary to retain them within the threshing chamber so that they will be passed between the teeth 16 and 19 several times before becoming thoroughly shelled. In order to retain the vegetables within the threshing chamber until they are thoroughly shelled, a swing door 23 is provided which is adapted to close the upper end of the hopper so as to retain the vegetables within the threshing chamber. This door 23 is pivotally supported by the side walls of the chute 21 and adapted to swing inwardly and close the upper end of the chute. In order that this door may be readily operated from the exterior of the body 4, a rod 24 is loosely connected to the door and extended back toward the rear of the body and provided with a handle member 25 whereby the rod 24 can be readily operated, to thus open and close this door 23. In order to retain the door 23 in an open or closed position, a rack 26 is attached to the body 4, having notches or teeth thereon adapted to be engaged by a catch formed on the rod 24 to retain the rod in various adjusted positions according to the desired position of the door.

Arranged within the separating chamber 22 is a movable separating plate 27 provided with a plurality of perforations 28 through which the shelled vegetables pass. This separating plate 27 is supported within the chamber 22 by the coil springs 29 preferably arranged at each corner of the plate and attached at one end thereto in any suitable manner while the other ends of the coil springs are suspended from the side walls of the body 4.

During the threshing operation, it often occurs that some of the pods or shells are passed on to the separating plate without having the vegetables contained therein removed and in order that these pods may be readily passed through the machine and into a suitable conveyer which returns them to the hopper 9, I provide a belt 29 herein shown as formed of canvas and provided with a plurality of transverse slats 30. This belt is mounted upon the rolls 31 arranged directly above the separating plate so that the slats 30 will pass over the plate and engage any of the unshelled pods and move them rearwardly into a hopper 32. The rolls 31 are mounted upon suitable shafts 33 and 33ª, the shaft 33 having suitable power applied thereto for moving the belt 29 and rolls 31 in which the shelled vegetables after having passed through the perforations 28 in the separating plate 27 are dropped into a suitable chamber 34 having a concave receptacle 35 in its lower side wall and in order that the vegetables may be removed from this chamber 34 a carrier 36 is rotatably mounted within the receptacle 35 and, as illustrated in the drawings, is in the form of a screw whereby, upon rotation of the same, the vegetables will be passed out to one side of the body 4 in a suitable chute 37 and thence into bags or any other receptacle which is used for receiving the shelled vegetables. In order to impart a reciprocating movement to the separating plate 27, a shaft 38 is arranged transversely of the body 4 at the rear end thereof and provided within its intermediate portion with a crank 39, and in order to connect the crank 39 with one end of the separating plate 27, link 40 is provided, one end of which is pivotally connected to the separating plate 27 while the other end thereof is loosely connected to the crank 39 on the shaft 38 whereby, upon rotation of the shaft 38, reciprocating movement will be imparted to the separating plate 27 so that the vegetables as they are passed on to this plate will be thoroughly separated from the pods or shells.

In order to provide for suitable draft means for carrying the empty pods or shells out through the rear end of the body 4, a fan 41 is located within the body 4 at the forward end thereof and preferably arranged in the inner end of the separating plate 27 so that after the shelled vegetables drop onto the separating plate, the draft from this fan will tend to carry the light shells or pods rearwardly over the separating plate 27 and out through the rear open end of the body 4.

In order that the unshelled vegetables, which have passed through the machine, may be returned to the hopper 9, a casing 42 is provided, having arranged therein a conveyer belt 43 which will convey the unshelled vegetables from the hopper or receptacle 32, up to the hopper 9. This conveyer belt 43 is operated by means of the power shaft 44 and in order to place the vegetables in such a position that they will be readily engaged by the cups 45 of the conveyer belt 43, a screw member 46 is arranged within the hopper 32 which will pass the unshelled vegetables into engagement with the cups 45 of the conveyer belt and thence be carried upwardly through the casing 42 into the hopper 9.

Having described the general construction of an improved threshing machine, it will be necessary to set forth the manner of applying power to the various parts which constitute the machine, and to this end it will be noted that the main power shaft from which the various moving elements obtain their power is the shaft 47 which extends transversely of the front of the machine and upon which the cylinder 17 is mounted. Mounted upon the outer end of this shaft 47 is a pulley 48, connected by means of a belt 49 to any suitable source of power. From this it will be apparent that power may be applied to the various moving elements of the machine.

Mounted upon the end of the shaft 47 opposite the pulley 48 are two pulleys 49 and 50, the pulley 49 being connected by means of a belt 51 to a pulley 52 mounted upon the fan shaft 53 to thus impart movement to the fan 41. A pulley 50 is connected by means of a belt 54 to the pulley 55, carried upon one end of the shaft 56 and mounted upon the same end of this shaft 56 are two pulleys, one of which is connected by means of a belt 57 to a pulley 58 by the outer end of the power shaft 44 at the rear of the machine, while the other pulley is connected by means of a belt 59 to the pulley 60 which is secured upon the outer end of the screw shaft 61, thus imparting movement to the two conveyer screws 36 and 46.

In order to impart movement to the belt 29 arranged within the separating chamber 22 of the machine, the shaft 33 is provided upon one of its outer ends with a pulley 62 which is connected, by means of a belt 63, to the end of the shaft 56 opposite the pulley 55 by means of the pulley 64. In order that movement may be imparted to the screw member 46, a pulley 65 is attached to the outer end of the shaft 66 upon which the screw member is mounted and this pulley 65 is connected by means of a belt 67 to a pulley arranged upon the shaft 56 adjacent the pulley 64. The shaft 38 which operates the shaker screen 27 is provided upon its outer end with a pulley 68 connected by means of a belt 69 to a pulley 70, carried by the fan shaft 53 and arranged upon the opposite side of the machine from the pulley 52 so that the power for reciprocating the shaker screen 27 is derived from the fan shaft 53, it receiving its power direct from the main shaft 47 through the medium of the pulley 49 and belt 51.

In order to provide for a suitable source of power for operating the machine, said power being conveyed to the machine through the medium of the belt 49′, it will be understood that as the body of the threshing machine itself is located upon the rear of the truck, a suitable engine may be mounted upon the forward end of the truck to operate the machine.

In the general operation of the machine, the peas, beans or similar vegetables which are to be shelled are first placed within the hopper 9 and fed into the threshing chamber where they will pass between the teeth 16 and 19, so that the vegetables in the pods or shells will be separated and then passed into the separating chamber 22, the pods or shells being removed through the rear end of the body 4 by means of the draft created through the rotation of the fan 41 while the shelled vegetables will pass through the shaker screen 27 and down into the receptacle 35 from whence they will be removed into suitable vessels. It will be noted that any unshelled vegetables will be passed rearwardly over the shaker screen 27 by means of the belt 29 and disposed into the receptacle 32 and thence conveyed by means of the screw 46 onto the conveyer belt 43, where they will be moved upwardly and returned to the hopper 9 to be passed through the threshing chamber again. It is usually desired that a person remain in front of the machine to see that the passage into the threshing chamber does not become clogged and in order that this person may assume a comfortable position for watching this passage, a box or stand 71 is arranged upon the platform of the truck at the forward end of the body and this box is provided with a hinged cover 72 so that the box may be suitably used for the storage of tools or articles of the like character. In mounting the body of the machine upon the platform of the truck, it will be noticed that the same is secured in position thereon by means of suitable bolts 73 extending through the platform and through rigid parts of the body 4 as clearly illustrated in Figs. 1 and 2.

What I claim is:

A machine of the class described including a body member, a threshing chamber located at one end thereof, a separating chamber within the body having communication with the threshing chamber, separating means within the last mentioned chamber, a swinging door arranged within the body and adapted to close communication between the threshing chamber and separating chamber and means for manually operating said door.

In testimony whereof I affix my signature in presence of two witnesses.

THOMAS TILFORD KENNERLY.

Witnesses:
S. T. McGINNIS,
W. T. ROBERTS.